US012705724B2

(12) United States Patent
Hegde et al.

(10) Patent No.: US 12,705,724 B2
(45) Date of Patent: Aug. 11, 2026

(54) SYSTEM AND METHOD FOR DEFECT DETECTION USING DEEP LEARNING-BASED IMAGE SEGMENTATION

(71) Applicant: KLA Corporation, Milpitas, CA (US)

(72) Inventors: Arjun Hegde, Fremont, CA (US); Surajit Mondal, Chennai (IN); Balla Guna Sai Sandeep, Chennai (IN); Chandrashekaran Gurumurthy, Chennai (IN)

(73) Assignee: KLA Corporation, Milpitas, CA (US)

( * ) Notice: Subject to any disclaimer, the term of this patent is extended or adjusted under 35 U.S.C. 154(b) by 12 days.

(21) Appl. No.: 18/797,674

(22) Filed: Aug. 8, 2024

(65) Prior Publication Data

US 2025/0363617 A1 Nov. 27, 2025

(30) Foreign Application Priority Data

May 24, 2024 (IN) ............................ 202441040445

(51) Int. Cl.
*G06V 10/00* (2022.01)
*G06T 3/40* (2006.01)
(Continued)

(52) U.S. Cl.
CPC .............. *G06T 7/0008* (2013.01); *G06T 3/40* (2013.01); *G06T 7/10* (2017.01); *G06V 10/44* (2022.01);
(Continued)

(58) Field of Classification Search
CPC G06T 7/10; G06T 7/0008; G06T 3/40; G06T 2207/10061; G06V 10/82;
(Continued)

(56) References Cited

U.S. PATENT DOCUMENTS 11,239,048 B2 2/2022 Brodie et al.
11,410,830 B1 8/2022 Xiao et al.
(Continued)

FOREIGN PATENT DOCUMENTS

CN 115601355 A 1/2023
CN 117218076 A 12/2023

OTHER PUBLICATIONS

Korean Intellectual Property Office, International Search Report and Written Opinion received in International Application No. PCT/US2025/029669, Aug. 26, 2025, 7 pages.

*Primary Examiner* — Amir Alavi
(74) *Attorney, Agent, or Firm* — Suiter Swantz IP

(57) ABSTRACT

A system may be configured to receive training images of features on the sample. The system may be configured to generate a segmentation model based on the training images. The system may be configured to receive product images of product features and identify, using the segmentation model, features of interest based on the product images. The system may be configured to generate a segmentation model image including segmentation masks corresponding to the identified features of interest and adjust a size of the segmentation masks based on a size of the identified features of interest. The system may be configured to determine a difference-based attribute value for each identified feature of interest based on the adjusted size of the segmentation masks. The system may be configured to determine whether each of the
(Continued)

identified features of interest are defects based on the difference-based attribute value and a predetermined threshold.

29 Claims, 4 Drawing Sheets

(51) Int. Cl.
*G06T 7/00* (2017.01)
*G06T 7/10* (2017.01)
*G06V 10/44* (2022.01)
*G06V 20/70* (2022.01)

(52) U.S. Cl.
CPC .... *G06V 20/70* (2022.01); *G06T 2207/10061* (2013.01)

(58) Field of Classification Search
CPC .... G06V 10/44; G06V 10/761; G06V 10/762; G06V 10/764; G06V 10/765; G06V 10/7715; G06V 20/70; G06N 20/00; G06N 20/10; G06N 20/20
See application file for complete search history.

(56) References Cited

U.S. PATENT DOCUMENTS 11,468,553 B2 * 10/2022 Kulkarni .................. G06T 5/73
11,880,193 B2 1/2024 Yati et al.
12,002,212 B2 * 6/2024 Chen .................... G06T 7/0012
12,079,982 B2 * 9/2024 Perkins .................. G06T 7/001
12,229,935 B2 * 2/2025 Brauer .............. G06V 10/7747
2004/0258324 A1 * 12/2004 Liang ....................... G06T 5/92 382/270
2013/0034293 A1 * 2/2013 Xu ......................... G06T 7/001 382/141
2017/0192411 A1 7/2017 Ghadar et al.
2020/0309718 A1 * 10/2020 Buzaglo .................. G06N 3/09
2021/0364448 A1 * 11/2021 Mekala ........... G01N 21/95607
2022/0108862 A1 4/2022 Chubun et al.
2023/0052727 A1 2/2023 Bargoti et al.
2023/0153987 A1 5/2023 Perkins et al.
2023/0214985 A1 * 7/2023 Li ........................... G06N 3/09 382/141
2024/0097215 A1 * 3/2024 Wegner ................. G01N 23/18
2024/0194440 A1 6/2024 Jiang et al.

* cited by examiner

SYSTEM AND METHOD FOR DEFECT DETECTION USING DEEP LEARNING-BASED IMAGE SEGMENTATION

CROSS-REFERENCE TO RELATED APPLICATIONS

The present application claims the benefit of India Provisional Application No. 202441040445, filed May 24, 2024, which is incorporated herein by reference in the entirety.

TECHNICAL FIELD

The present disclosure relates generally to sample inspection and, more particularly, to a system and method for sample defect detection using deep learning-based image segmentation.

BACKGROUND

Demand for electronic logic and memory devices with ever-smaller footprints and features present a wide range of manufacturing challenges beyond fabrication at a desired scale. In the context of semiconductor fabrication, predicting and removing defects from semiconductor devices is an important step in improving throughput and yield. One of the primary challenges in identifying defects is the inability to predict the location, type, and structure of defects accurately.

Deep learning models are often used to identify defects. However, existing deep learning-based defect detection techniques are difficult to train and unreliable. For example, since defects have a lot of variations, finding enough ground truth to train the model properly is challenging and requires several iterations. For instance, often only one feature of interest is labeled per image, such that a large amount of training data is needed to properly train the model. This is time consuming and the amount of nuisance in the detection results is often very high, thus resulting in unreliable defect detection.

Therefore, it is desirable to provide systems and methods for curing one or more of the above deficiencies.

SUMMARY

A system for detecting defects on a sample is disclosed, in accordance with one or more embodiments of the present disclosure. In embodiments, the system includes a controller including one or more processors configured to execute a set of program instructions stored in memory. In embodiments, the set of program instructions are configured to cause the one or more processors to: receive one or more product images of a plurality of product features on the sample; identify, using a deep learning segmentation model, one or more features of interest of the plurality of product features on the sample based on the received one or more product images; generate a segmentation model image of the sample, where the segmentation model image includes one or more segmentation masks corresponding to the identified one or more features of interest; adjust a size of the one or more segmentation masks based on a size of the identified one or more features of interest; determine a difference-based attribute value for each of the identified one or more features of interest on the sample based on the adjusted size of the one or more segmentation masks; and determine whether each of the identified one or more features of interest on the sample are defects based on the determined difference-based attribute value corresponding to each of the one or more identified features of interest on the sample and a predetermined threshold.

A system for detecting defects on a sample is disclosed, in accordance with one or more embodiments of the present disclosure. In embodiments, the system includes a characterization sub-system configured to acquire one or more images of the sample. In embodiments, the system includes a controller communicatively coupled to the characterization sub-system. In embodiments, the controller includes one or more processors configured to execute a set of program instructions stored in memory. In embodiments, the set of program instructions are configured to cause the one or more processors to: receive one or more product images of a plurality of product features on the sample; identify, using a deep learning segmentation model, one or more features of interest of the plurality of product features on the sample based on the received one or more product images; generate a segmentation model image of the sample, where the segmentation model image includes one or more segmentation masks corresponding to the identified one or more features of interest; adjust a size of the one or more segmentation masks based on a size of the identified one or more features of interest; determine a difference-based attribute value for each of the identified one or more features of interest on the sample based on the adjusted size of the one or more segmentation masks; and determine whether each of the identified one or more features of interest on the sample are defects based on the determined difference-based attribute value corresponding to each of the one or more identified features of interest on the sample and a predetermined threshold.

A method is disclosed, in accordance with one or more embodiments of the present disclosure. In embodiments, the method includes, but is not limited to, identifying, using a deep learning segmentation model, one or more features of interest of the plurality of product features on the sample based on the received one or more product images; generating a segmentation model image of the sample, where the segmentation model image includes one or more segmentation masks corresponding to the identified one or more features of interest; adjusting a size of the one or more segmentation masks based on a size of the identified one or more features of interest; determining a difference-based attribute value for each of the identified one or more features of interest on the sample based on the adjusted size of the one or more segmentation masks; and determining whether each of the identified one or more features of interest on the sample are defects based on the determined difference-based attribute value corresponding to each of the one or more identified features of interest on the sample and a predetermined threshold.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF DRAWINGS

The numerous advantages of the disclosure may be better understood by those skilled in the art by reference to the accompanying figures in which.

DETAILED DESCRIPTION

Reference will now be made in detail to the subject matter disclosed, which is illustrated in the accompanying drawings. The present disclosure has been particularly shown and described with respect to certain embodiments and specific features thereof. The embodiments set forth herein are taken to be illustrative rather than limiting. It should be readily apparent to those of ordinary skill in the art that various changes and modifications in form and detail may be made without departing from the spirit and scope of the disclosure.

Embodiments of the present disclosure are directed to a system and method for defect detection using deep learning-based image segmentation. For example, the defect detection system and method may utilize a supervised deep learning-based model to identify defects on a sample. The supervised deep learning model may include an image segmentation model configured to identify all instances of one or more features of interest in each field of view (FOV) of a defect image, where a difference-based attribute may be determined for each of the identified features of interest. If the difference-based attribute (e.g., grey level, standard deviation, or the like) exceeds a predetermined threshold, the defect detection system and method may identify such feature as a defect. Conversely, if the difference-based attribute does not exceed the predetermined threshold, the defect detection system and method may ignore such feature (e.g., drop it from the final lot result).

The image segmentation model may be trained using user-labeled training images. For example, each user-labeled training image may include a defect image including a plurality of labeled features of interest. It is contemplated herein that since each training image includes a plurality labeled features of interest, instead of only a single feature of interest per image, the image segmentation model is able to be properly trained using less training data. As such, the training of the image segmentation model of the present disclosure is less time consuming than existing methods.

Referring now to FIGS. 1-4, systems and methods for defect detection using deep learning-based image segmentation are described in greater detail in accordance with one or more embodiments of the present disclosure.

Figure 1:
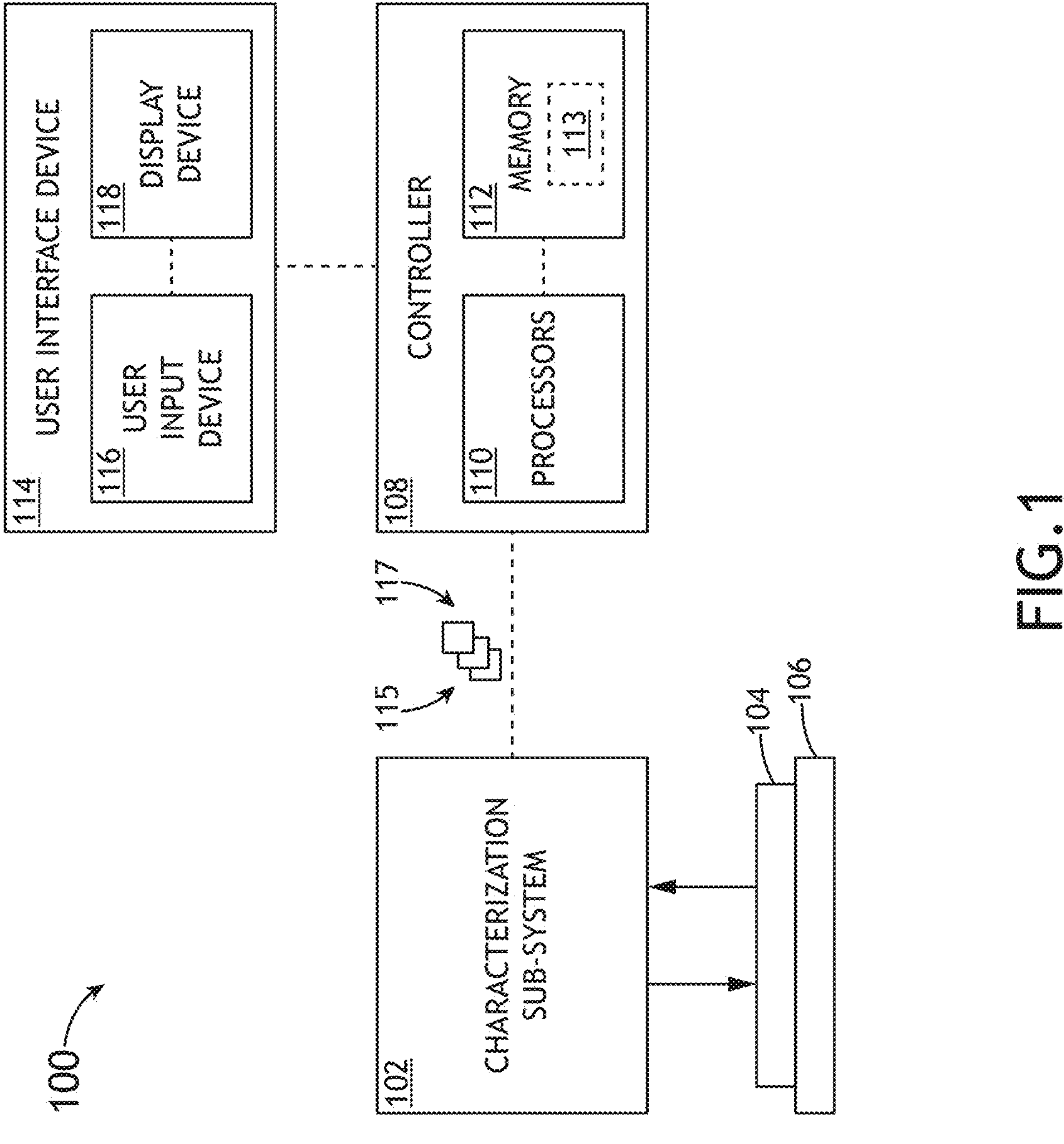
FIG. 1 illustrates a block diagram view of a system for defect detection, in accordance with one or more embodiments of the present disclosure.

FIG. 1 illustrates a block diagram view of a system 100 for defect detection using deep learning-based image segmentation, in accordance with one or more embodiments of the present disclosure. In embodiments, the system 100 includes a characterization sub-system 102 and a controller 108 communicatively coupled to the characterization sub-system 102.

The characterization sub-system 102 may be configured to inspect and/or image a sample 104 secured on a sample stage 106. The characterization sub-system 102 may include any characterization sub-system 102 known in the art including, but not limited to, an optical-based characterization system, a charged particle-based characterization system, and the like. For example, the characterization sub-system 102 may include a scanning electron microscopy (SEM) characterization system.

The controller 108 may include one or more processors 110 and memory 112. The one or more processors 110 may be configured to execute a set of program instructions maintained in the memory 112. The one or more processors 110 of controller 108 may be configured to execute a deep learning segmentation model 113 configured to perform deep learning-based defect detection on the sample 104. For example, the deep learning segmentation model 113 may be stored in memory 112. It is contemplated herein that the deep learning segmentation model 113 may be any type of deep learning model. For example, the deep learning model 113 may be a supervised deep learning model.

In embodiments, the one or more processors 110 may be configured to receive one or more training images 115 of a plurality of features on the sample 104. By way of another example, the one or more processors 110 may be configured to generate the deep learning segmentation model 113 based on the received one or more training images 115 of the plurality of features on the sample. By way of another example, the one or more processors 110 may be configured to receive one or more product images 117 of a plurality of features on the sample from the characterization sub-system 102. By way of another example, the one or more processors 110 may be configured to identify, using the generated deep learning segmentation model 113, one or more product features of interest of the plurality of features on the sample 104 based on the received one or more product images 117. By way of another example, the one or more processors 110 may be configured to generate a segmentation model image of the sample 104 including one or more segmentation masks corresponding to the identified one or more features of interest. By way of another example, the one or more processors 110 may be configured to adjust a size of the one or more segmentation masks based on a size of the identified one or more features of interest. By way of another example, the one or more processors 110 may be configured to determine a difference-based attribute value for each of the identified one or more features of interest on the sample 104 based on the adjusted size of the one or more segmentation masks. By way of another example, the one or more processors 110 may be configured to determine whether each of the identified one or more features of interest on the sample are defects based on the determined difference-based attribute value corresponding to each of the one or more identified features of interest on the sample and a predetermined threshold.

In embodiments, the system 100 includes a user interface 114 communicatively coupled to the controller 108. The user interface 114 may include a user input device 116 and a display 118. The user input device 116 of the user interface 114 may be configured to receive one or more input commands from a user, the one or more input commands configured to input data into the system 100 and/or adjust one or more characteristics of the system 100. For example, the user input device 116 may be configured to receive user labels for the training images 115 from the user. For instance, the user may label the plurality of features of interest on a respective training image 115, where the labeled training image may be used to train the deep learning segmentation model 113. In this regard, as will be discussed further herein, the deep learning segmentation model 113 may be a supervised deep learning model (i.e., trained using user-labeled training images). The display of the user interface 114 may be configured to display data of the system 100 to a user.

The sample 104 may include any sample known in the art including, but not limited to, a wafer, a reticle, a photomask, flat panel display, and the like. In embodiments, the sample 104 is disposed on the stage assembly 106 to facilitate movement of the sample 104. For example, the stage assembly 106 may include an actuatable stage. For instance, the stage assembly 106 may include, but is not limited to, one or more translational stages suitable for selectively translating the sample 104 along one or more linear directions (e.g., x-direction, y-direction and/or z-direction). By way of another example, the stage assembly 106 may include, but is not limited to, one or more rotational stages suitable for selectively rotating the sample 104 along a rotational direction. By way of another example, the stage assembly 106 may include, but is not limited to, a rotational stage and a translational stage suitable for selectively translating the sample 104 along a linear direction and/or rotating the sample 104 along a rotational direction. It is noted herein that the system 100 may operate in any scanning mode known in the art.

Figure 2:
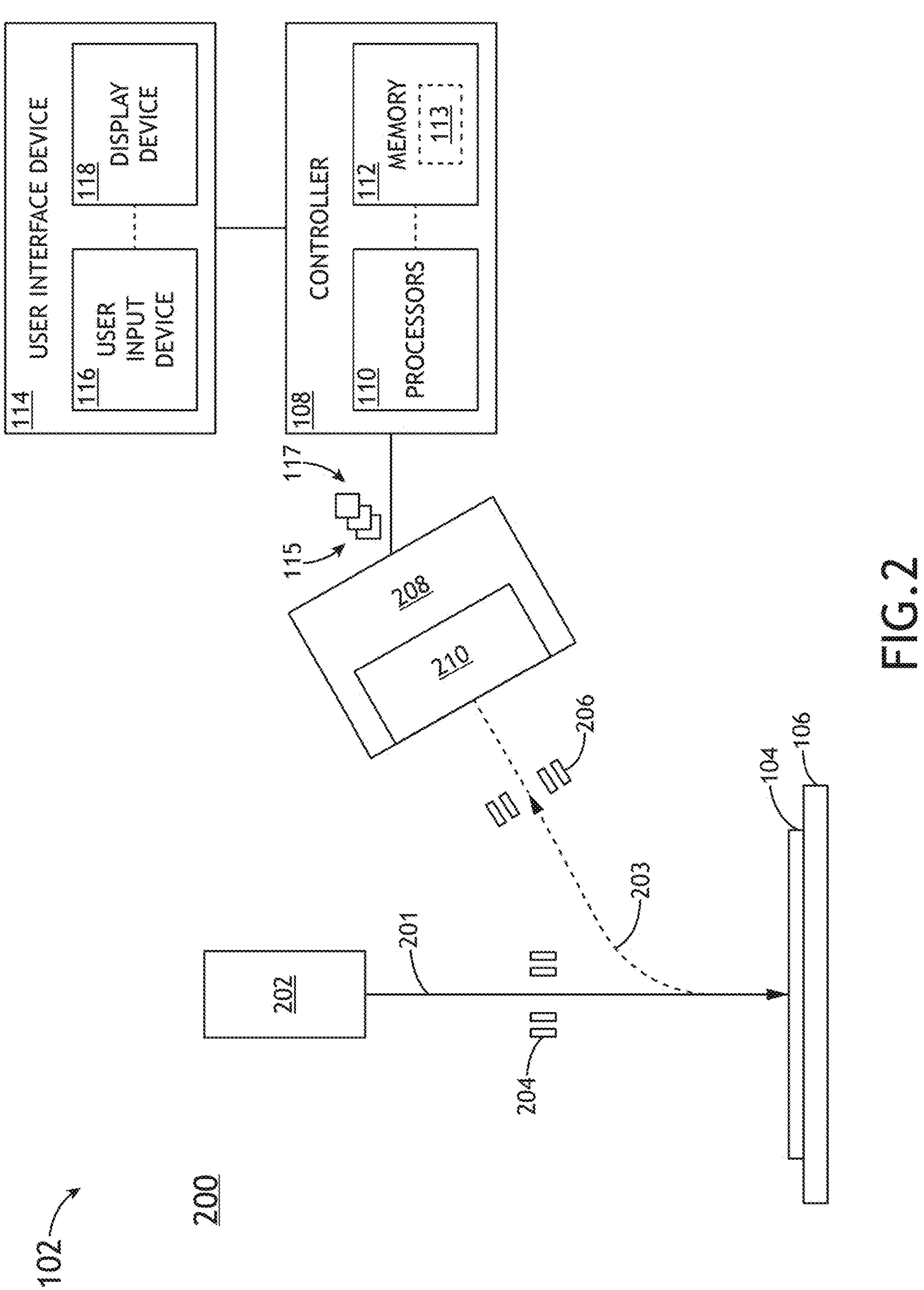
FIG. 2 illustrates a simplified schematic view of an SEM-based characterization sub-system of the system for defect detection, in accordance with one or more embodiments of the present disclosure.

FIG. 2 illustrates a simplified schematic view of the characterization sub-system 102, in accordance with one or more embodiments of the present disclosure.

In embodiments, the characterization sub-system 102 includes an SEM inspection sub-system 200 configured to perform inspection of the sample 104. In this regard, the SEM inspection sub-system 200 may be configured to acquire one or more images of the sample 104. The SEM inspection sub-system 200 may include, but is not limited to, an electron beam source 202, one or more electron-optical elements 204, one or more collection electron-optical elements 206, and an electron detector assembly 208 including one or more electron sensors 210. In embodiments, the electron beam source 202 is configured to direct one or more electron beams 201 to the sample 104. The electron-optical elements 204 may form an electron-optical column. In embodiments, the system 100 may include one or more additional and/or alternative electron-optical elements 204 configured to focus and/or direct the one or more electron beams 201 to the surface of the sample 104. The one or more electron-optical elements 206 may be configured to collect secondary and/or backscattered electrons 203 emanated from the surface of the sample 104 in response to the one or more electron beams 201. It is noted herein that the one or more electron-optical elements 204 and the one or more electron-optical elements 206 may include any electron-optical elements configured to direct, focus, and/or collect electrons including, but not limited to, one or more deflectors, one or more electron-optical lenses, one or more condenser lenses (e.g., magnetic condenser lenses), one or more objective lenses (e.g., magnetic condenser lenses), and the like.

It is noted that the electron optical assembly of the SEM inspection sub-system 200 is not limited to the electron-optical elements depicted in FIG. 2, which is provided merely for illustrative purposes. It is further noted that the system 100 may include any number and type of electron-optical elements necessary to direct/focus the one or more electron beams 201 onto the sample 104 and, in response, collect and image the emanated secondary and/or backscattered electrons 203 onto the electron detector assembly 208.

SEM sub-systems are generally discussed in U.S. Pat. No. 11,239,048, issued Feb. 1, 2022; U.S. Pat. No. 11,410,830, issued Aug. 9, 2022; U.S. Patent Publication No. 2024/0194440, published Jun. 13, 2024; U.S. Patent Publication No. 2022/0108862, published Apr. 7, 2022; and U.S. Pat. No. 11,880,193, issued Jan. 23, 2024, all of which are incorporated by reference in their entirety.

Figure 3:
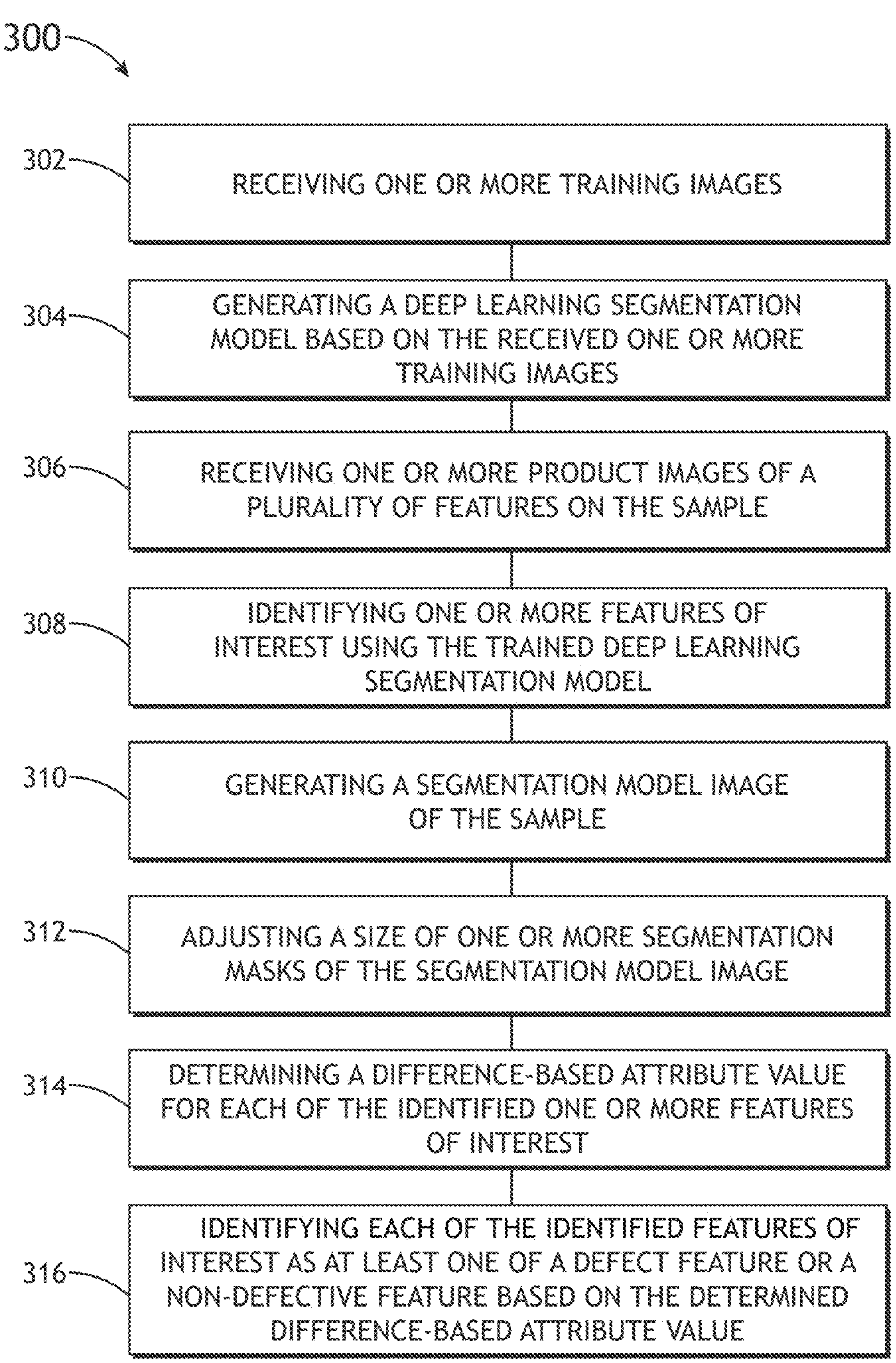
FIG. 3 illustrates a flow diagram illustrating a method for defect detection using deep learning-based image segmentation, in accordance with one or more embodiments of the present disclosure.
Figure 4:
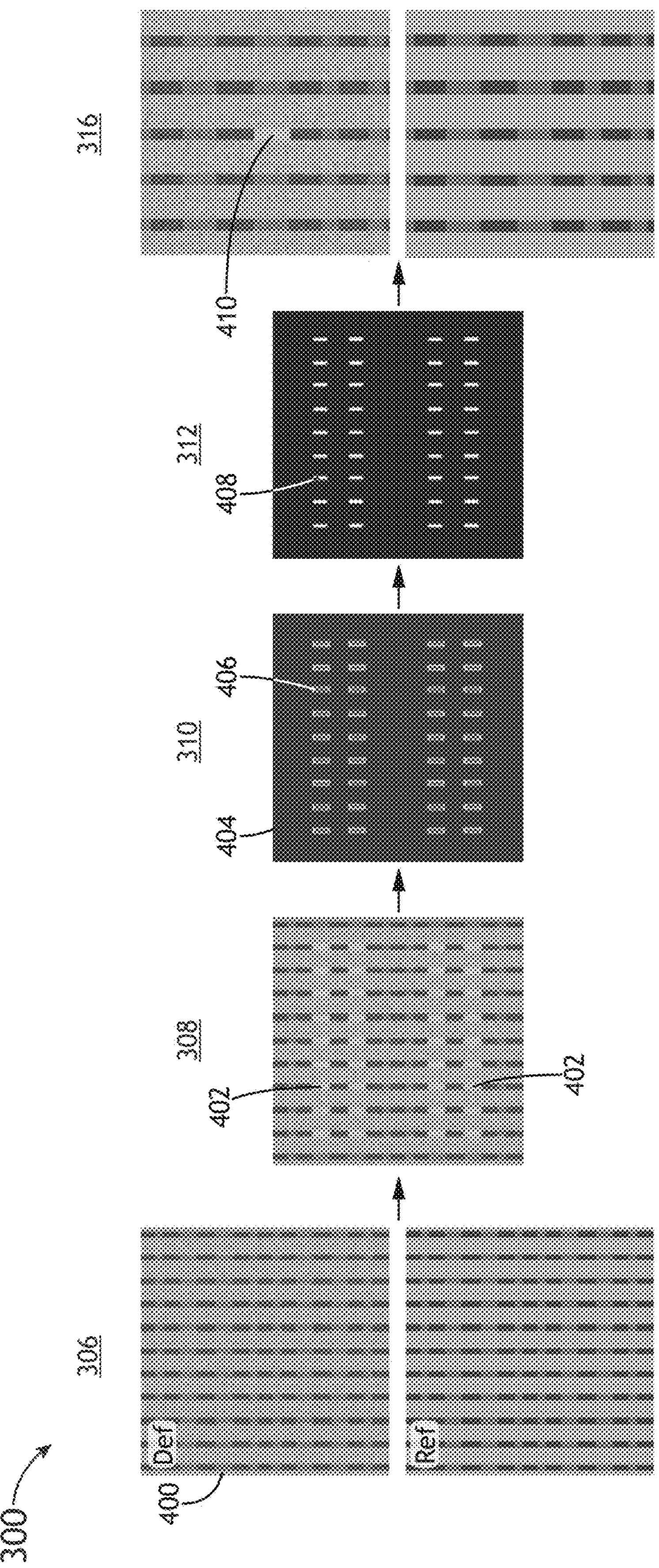
FIG. 4 illustrates a conceptual flow diagram depicting the method for defect detection using deep learning-based image segmentation, in accordance with one or more embodiments of the present disclosure.

FIG. 3 illustrates a flow diagram depicting a method 300 of deep learning-based defect detection using image segmentation, in accordance with one or more embodiments of the present disclosure. FIG. 4 illustrates a conceptual flow diagram depicting the method 300 of deep learning-based defect detection using image segmentation, in accordance with one or more embodiments of the present disclosure. It is noted herein that the embodiments and enabling technologies described previously herein in the context of the system 100 should be interpreted to extend to the method 300. It is further noted, however, that the method 300 is not limited to the architecture of the system 100.

In embodiments, the method 300 includes a step 302 of receiving one or more training images of a plurality of features on the sample. For example, the one or more processors 110 may be configured to receive one or more training images 115 from the characterization sub-system 102 (or other system). For instance, the one or more processors 110 may be configured to receive one or more SEM training images 115 from the SEM inspection sub-system 200.

In embodiments, the one or more training images 115 may be user-labeled images. For example, the one or more processors 110 may be configured to receive one or more user-labels (via the user interface 114) for each feature of the plurality of features on the sample 104. As previously noted herein, since each training image includes a plurality labeled features of interest (rather than one labeled feature per image), the image segmentation model of the present disclosure is able to be trained using much less training data.

In embodiments, the method 300 includes a step 304 of generating a deep learning segmentation model 113 based on the received one or more training images 115 of the plurality of features on the sample 104. For example, the one or more processors 110 may be configured to train the deep learning segmentation model 113 based on the user-labeled training images 115. In this regard, the one or more processors 110 may be configured to train the deep learning segmentation model 113 to identify all instances of the features on a given sample based on the user-labeled training images 115.

In embodiments, the method 300 includes a step 306 of receiving one or more product images 117 of a plurality of product features on the sample 104. For example, the one or more processors 110 may be configured to receive one or more product images 117 from the characterization sub-system 102 (or other system). For instance, as shown in FIG. 4, the one or more processors 110 may be configured to receive one or more SEM product images 400 from the SEM inspection sub-system 200.

In embodiment, the method 300 includes a step 308 of identifying, using the generated deep learning segmentation model 113, one or more features of interest of the plurality of features on the sample based on the received one or more product images. For example, the deep learning segmentation model 113 of the one or more processors 110 may be configured to identify all instances of one or more features of interest 402 on the product image 400. In a non-limiting example, as shown in FIG. 4, the deep learning segmentation model 113 may be configured to identify all instances of fins 402 on the product image 400 of the sample 104. For instance, the deep learning segmentation model 113 may be configured to identify 36 instances of fins 402 on the product image 400 of the sample 104, where at least one fin of the plurality of fins 402 may be a defect.

In embodiments, the method 300 includes a step 310 of generating a segmentation model image of the sample. For example, the one or more processors 110 may be configured to generate a segmentation model image 404 of the sample 104, where the segmentation model image 404 includes one or more segmentation masks 406 corresponding to the identified one or more features of interest 402. In a non-limiting example, as shown in FIG. 4, the segmentation model image 404 may include 36 segmentation mask 406 corresponding to the 36 identified fins 402.

In embodiments, the method 300 includes a step 312 of adjusting a size of the one or more segmentation masks based on a size of the identified one or more features of interests. For example, the one or more processors 110 may be configured to adjust a size of each of the segmentation masks 406 based on a size of the identified one or more features of interest 402. For instance, the segmentation model image 404 may indicate a probability that the masks 406 maps to the physical identified feature of interest 402. In this regard, the adjusted segmentation mask 408 may match the size of the feature of interest 402, such that the difference-based attribute is calculated accurately (in step 314).

In embodiments, the method 300 includes a step 314 of determining a difference-based attribute value for each of the identified one or more features of interest on the sample based on the adjusted size of the one or more segmentation masks. For example, the one or more processors 110 may be configured to determine a difference-based attribute value for each of the identified one or more features of interest 402 on the sample based on the adjusted size 408 of the one or more segmentation masks 406.

In some instances, the difference-based attribute values may include a grey level value. For example, the one or more processors 110 may be configured to determine a grey level value for each interest 402 on the sample 104 based on the adjusted segmentation mask 408.

In some instances, the difference-based attribute values may include a standard deviation value. For example, the one or more processors 110 may be configured to determine a standard deviation value for each interest 402 on the sample 104 based on the adjusted segmentation mask 408.

In embodiments, the method 300 includes a step 316 of determining whether each of the identified one or more features of interest on the sample are defects based determined attribute value (step 314) corresponding to each of the one or more identified features of interest on the sample and a predetermined threshold. For example, during runtime, the one or more processors 110 may be configured to compare the difference-based attribute value determined in step 314 to a predetermined threshold. In some instances, the predetermined threshold may be a user-defined threshold. As such, the one or more processors 110 may be configured to receive the user-defined threshold via the user interface 114.

If the difference-based attribute value determined in step 314 is below the predetermined threshold, the one or more processors 110 may be configured to classify the associated interest 402 as a non-defective feature. For example, the one or more processors 110 may be configured to ignore the non-defective feature when reporting the final result.

If the difference-based attribute value determined in step 314 is greater than (or equal to) the predetermined threshold, the one or more processors 110 may be configured to classify the associated interest 402 as a defective feature (or defect). In a non-limiting example, as shown in FIG. 4, a defective feature 410 may be identified out of the 36 instances of interest 402 identified in step 308. In this regard, the one or more processors 110 may be configured to report only the defects in the final lot result, such that the occurrence of nuisance in the final lot is minimized and the final lot result is more reliable.

Referring again to FIG. 1, additional components of the system 100 are described in greater detail in accordance with one or more embodiments of the present disclosure.

The one or more processors 110 of the controller 108 may generally include any processor or processing element known in the art. For the purposes of the present disclosure, the term "processor" or "processing element" may be broadly defined to encompass any device having one or more processing or logic elements (e.g., one or more microprocessor devices, one or more application specific integrated circuit (ASIC) devices, one or more field programmable gate arrays (FPGAs), or one or more digital signal processors (DSPs)). In this sense, the one or more processors 110 may include any device configured to execute algorithms and/or instructions (e.g., program instructions stored in memory). In one embodiment, the one or more processors 110 may be embodied as a desktop computer, mainframe computer system, workstation, image computer, parallel processor, networked computer, or any other computer system configured to execute a program configured to operate or operate in conjunction with the system 100, as described throughout the present disclosure. Moreover, different subsystems of the system 100 may include a processor or logic elements suitable for carrying out at least a portion of the steps described in the present disclosure. Therefore, the above description should not be interpreted as a limitation on the embodiments of the present disclosure but merely as an illustration. Further, the steps described throughout the present disclosure may be carried out by a single controller or, alternatively, multiple controllers. Additionally, the controller 108 may include one or more controllers housed in a common housing or within multiple housings. In this way, any controller or combination of controllers may be separately packaged as a module suitable for integration into metrology system 100. Further, the controller 108 may analyze or otherwise process data received from the characterization sub-system 102 and feed the data to additional components within the system 100 or external to the system 100.

Further, the memory device 112 may include any storage medium known in the art suitable for storing program instructions executable by the associated one or more processors 110. For example, the memory device 112 may include a non-transitory memory medium. As an additional example, the memory device 112 may include, but is not limited to, a read-only memory, a random-access memory, a magnetic or optical memory device (e.g., disk), a magnetic tape, a solid-state drive and the like. It is further noted that memory device 112 may be housed in a common controller housing with the one or more processors 110.

In this regard, the controller 108 may execute any of various processing steps associated with characterization. For example, the controller 108 may be configured to generate control signals to direct or otherwise control the characterization sub-system 102, or any components thereof. For instance, the controller 108 may be configured to direct the stage 106 to translate the sample 104 along one or more measurement paths or swaths. By way of another example, the controller 108 may be configured to receive images from the characterization sub-system 102. By way of another example, the controller 108 may generate correctables for one or more additional fabrication sub-systems as feedback and/or feed-forward control of the one or more additional fabrication sub-systems based on measurements from the characterization sub-system 102.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken as limiting.

Those having skill in the art will appreciate that there are various vehicles by which processes and/or systems and/or other technologies described herein can be implemented (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary.

The previous description is presented to enable one of ordinary skill in the art to make and use the invention as provided in the context of a particular application and its requirements. As used herein, directional terms such as “top,” “bottom,” “over,” “under,” “upper,” “upward,” “lower,” “down,” and “downward” are intended to provide relative positions for purposes of description, and are not intended to designate an absolute frame of reference. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

All of the methods described herein may include storing results of one or more steps of the method embodiments in memory. The results may include any of the results described herein and may be stored in any manner known in the art. The memory may include any memory described herein or any other suitable storage medium known in the art. After the results have been stored, the results can be accessed in the memory and used by any of the method or system embodiments described herein, formatted for display to a user, used by another software module, method, or system, and the like. Furthermore, the results may be stored “permanently,” “semi-permanently,” temporarily,” or for some period of time. For example, the memory may be random access memory (RAM), and the results may not necessarily persist indefinitely in the memory.

It is further contemplated that each of the embodiments of the method described above may include any other step(s) of any other method(s) described herein. In addition, each of the embodiments of the method described above may be performed by any of the systems described herein.

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively “associated” such that the desired functionality is achieved. Hence, any two components herein combined to achieve a particular functionality can be seen as “associated with” each other such that the desired functionality is achieved, irrespective of architectures or intermedial components. Likewise, any two components so associated can also be viewed as being “connected,” or “coupled,” to each other to achieve the desired functionality, and any two components capable of being so associated can also be viewed as being “couplable,” to each other to achieve the desired functionality. Specific examples of couplable include but are not limited to physically mateable and/or physically interacting components and/or wirelessly interactable and/or wirelessly interacting components and/or logically interacting and/or logically interactable components.

Furthermore, it is to be understood that the invention is defined by the appended claims. It will be understood by those within the art that, in general, terms used herein, and especially in the appended claims (e.g., bodies of the appended claims) are generally intended as “open” terms (e.g., the term “including” should be interpreted as “including but not limited to,” the term “having” should be interpreted as “having at least,” the term “includes” should be interpreted as “includes but is not limited to,” and the like). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases “at least one” and “one or more” to introduce claim recitations. However, the use of such phrases should not be construed to imply that the introduction of a claim recitation by the indefinite articles “a” or “an” limits any particular claim containing such introduced claim recitation to inventions containing only one such recitation, even when the same claim includes the introductory phrases “one or more” or “at least one” and indefinite articles such as “a” or “an” (e.g., “a” and/or “an” should typically be interpreted to mean “at least one” or “one or more”); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of “two recitations,” without other modifiers, typically means at least two recitations, or two or more recitations). Furthermore, in those instances where a convention analogous to "at least one of A, B, and C, and the like" is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, and the like). In those instances where a convention analogous to "at least one of A, B, or C, and the like" is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, and the like). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed:

1. A system for detecting defects on a sample, the system comprising:

a controller including one or more processors configured to execute a set of program instructions stored in memory, the set of program instructions configured to cause the one or more processors to:

receive one or more product images of a plurality of product features on the sample;

identify, using a deep learning segmentation model, one or more features of interest of a plurality of product features on the sample based on the received one or more product images;

generate a segmentation model image of the sample, wherein the segmentation model image includes a respective segmentation mask corresponding to each identified feature of interest;

adjust a size of each respective segmentation mask based on a size of a corresponding identified feature of interest, such that an adjusted segmentation mask matches the size of the corresponding identified feature of interest;

determine a difference-based attribute value for each identified feature of interest on the sample based on the adjusted size of a corresponding segmentation mask; and determine whether each identified feature of interest on the sample are defects based on comparing, for each identified feature of interest, the determined difference-based attribute value corresponding to the identified feature of interest to a predetermined threshold.

2. The system of claim 1, wherein the set of program instructions are further configured to cause the one or more processors to:

receive one or more training images of the plurality of features on the sample, wherein the plurality of features on the sample are identified on the received one or more training images; and generate the deep learning segmentation model based on the received one or more training images of the plurality of features on the sample.

3. The system of claim 2, wherein the one or more training images include one or more labeled training images, wherein each feature of the plurality of features on the sample are labeled in the one or more labeled training images.

4. The system of claim 1, wherein the determine whether each of the identified one or more features of interest on the sample are defects based on the determined difference-based attribute value corresponding to each of the one or more identified features of interest on the sample and a predetermined threshold comprises:

comparing, during runtime, the determined difference-based attribute value to the predetermined threshold for each of the one or more identified features of interest.

5. The system of claim 4, wherein a defect instance is determined when the determined difference-based attribute value is greater than the predetermined threshold for each of the one or more identified features of interest.

6. The system of claim 4, wherein a non-defective instance is determined when the determined difference-based attribute value is less than the predetermined threshold for each of the one or more identified features of interest.

7. The system of claim 1, wherein the deep learning segmentation model is a supervised deep learning model.

8. The system of claim 1, wherein the difference-based attribute value includes at least one of:

a grey level value or a standard deviation value.

9. The system of claim 1, further comprising:

a characterization sub-system configured to acquire one or more images of the sample.

10. The system of claim 9, wherein the characterization sub-system includes a scanning electron microscopy sub-system.

11. The system of claim 1, wherein the predetermined threshold includes a user-defined threshold.

12. A system for detecting defects on a sample, the system comprising:

a characterization sub-system configured to acquire one or more images of the sample; and a controller communicatively coupled to the characterization sub-system, the controller includes one or more processors configured to execute a set of program instructions stored in memory, the set of program instructions configured to cause the one or more processors to:

receive one or more product images of a plurality of product features on the sample;

identify, using a deep learning segmentation model, one or more features of interest of a plurality of product features on the sample based on the received one or more product images;

generate a segmentation model image of the sample, wherein the segmentation model image includes a respective segmentation mask corresponding to each identified one or more feature of interest;

adjust a size of each respective segmentation mask based on a size of a corresponding identified feature of interest, such that an adjusted segmentation mask matches the size of the corresponding identified feature of interest;

determine a difference-based attribute value for each identified feature of interest on the sample based on the adjusted size of a corresponding segmentation mask; and determine whether each identified feature of interest on the sample are defects based on comparing, for each identified feature of interest, the determined difference-based attribute value corresponding to the identified feature of interest to a predetermined threshold.

13. The system of claim 12, wherein the set of program instructions are further configured to cause the one or more processors to:

receive one or more training images of the plurality of features on the sample, wherein the plurality of features on the sample are identified on the received one or more training images; and generate the deep learning segmentation model based on the received one or more training images of the plurality of features on the sample.

14. The system of claim 13, wherein the one or more training images include one or more labeled training images, wherein each feature of the plurality of features on the sample are labeled in the one or more labeled training images.

15. The system of claim 12, wherein the determine whether each of the identified one or more features of interest on the sample are defects based on the determined difference-based attribute value corresponding to each of the one or more identified features of interest on the sample and a predetermined threshold comprises:

comparing, during runtime, the determined difference-based attribute value to the predetermined threshold for each of the one or more identified features of interest.

16. The system of claim 15, wherein a defect instance is determined when the determined difference-based attribute value is greater than the predetermined threshold for each of the one or more identified features of interest.

17. The system of claim 15, wherein a non-defective instance is determined when the determined difference-based attribute value is less than the predetermined threshold for each of the one or more identified features of interest.

18. The system of claim 12, wherein the deep learning segmentation model is a supervised deep learning model.

19. The system of claim 12, wherein the difference-based attribute value includes at least one of:

a grey level value or a standard deviation value.

20. The system of claim 12, wherein the characterization sub-system includes a scanning electron microscopy sub-system.

21. The system of claim 12, wherein the predetermined threshold includes a user-defined threshold.

22. A method comprising:

receiving one or more product images of a plurality of product features on a sample;

identifying, using a deep learning segmentation model, one or more features of interest of a plurality of product features on the sample based on the received one or more product images;

generating a segmentation model image of the sample, wherein the segmentation model image includes a respective segmentation mask corresponding to each identified one or more feature of interest;

adjusting a size of each respective segmentation mask based on a size of a corresponding identified feature of interest, such that an adjusted segmentation mask matches the size of the corresponding identified feature of interest;

determining a difference-based attribute value for each identified feature of interest on the sample based on the adjusted size of a corresponding segmentation mask; and determining whether each identified feature of interest on the sample are defects based on comparing, for each identified feature of interest, the determined difference-based attribute value corresponding to the identified feature of interest to a predetermined threshold.

23. The method of claim 22, further comprising:

receiving one or more training images of the plurality of features on the sample, wherein the plurality of features on the sample are identified on the received one or more training images; and generating the deep learning segmentation model based on the received one or more training images of the plurality of features on the sample.

24. The method of claim 23, wherein the one or more training images include one or more labeled training images, wherein each feature of the plurality of features on the sample are labeled in the one or more labeled training images.

25. The method of claim 22, wherein the determining whether each of the identified one or more features of interest on the sample are defects based on the determined difference-based attribute value corresponding to each of the one or more identified features of interest on the sample and a predetermined threshold comprises:

comparing, during runtime, the determined difference-based attribute value to the predetermined threshold for each of the one or more identified features of interest.

26. The method of claim 22, wherein a defect instance is determined when the determined difference-based attribute value is greater than the predetermined threshold for each of the one or more identified features of interest.

27. The method of claim 22, wherein a non-defective instance is determined when the determined difference-based attribute value is less than the predetermined threshold for each of the one or more identified features of interest.

28. The method of claim 22, wherein the difference-based attribute value includes at least one of:

a grey level value or a standard deviation value.

29. The method of claim 22, wherein the predetermined threshold includes a user-defined threshold.

* * * * *